Feb. 23, 1943.                J. H. BECH                2,311,812
                            MILEAGE METER
             Filed June 3, 1942              5 Sheets-Sheet 1
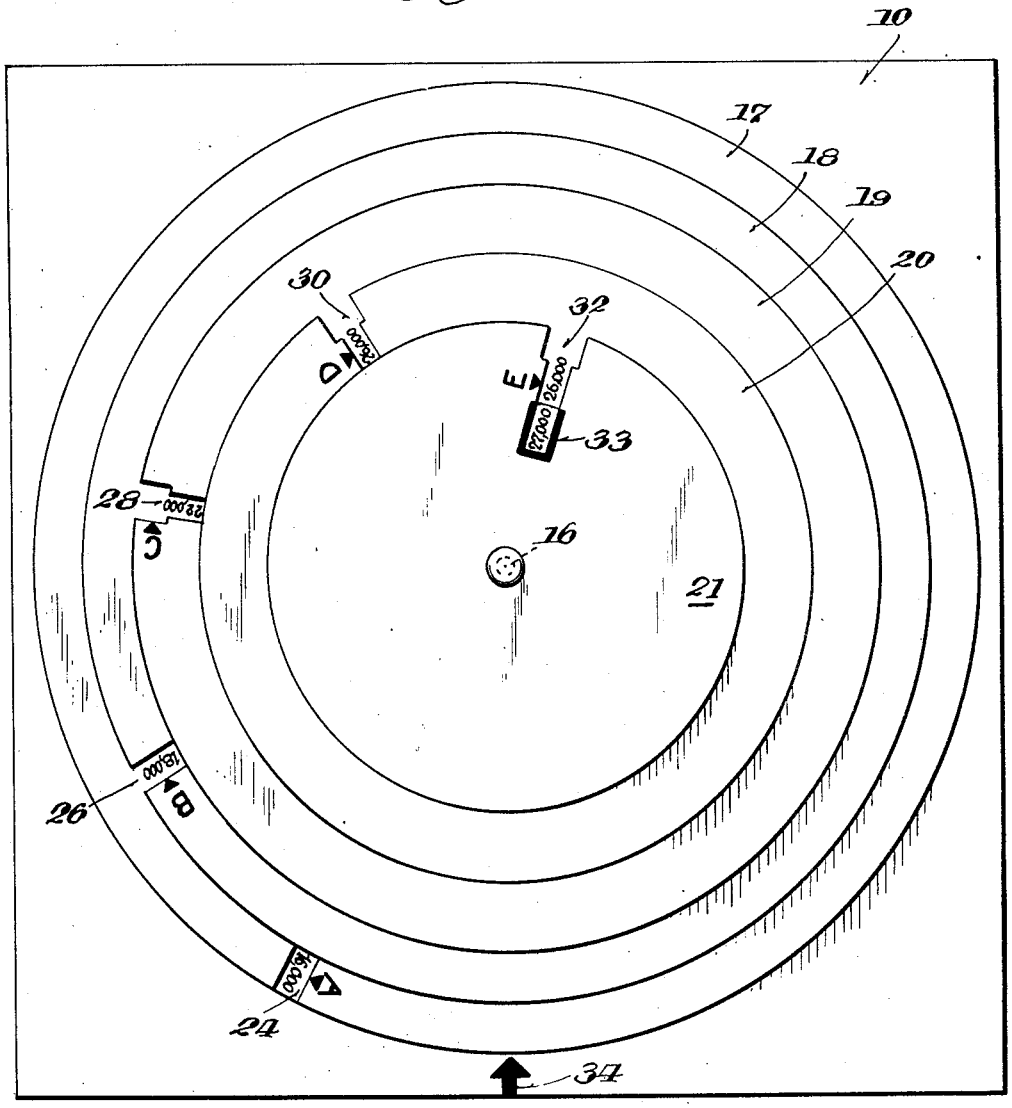
Inventor
John H. Bech,
By Seymour, Bright & Nottingham
Attorneys Feb. 23, 1943. J. H. BECH 2,311,812
MILEAGE METER
Filed June 3, 1942 5 Sheets-Sheet 2

Inventor
John H. Bech,
By Seymour, Bright & Nottingham
Attorneys

Feb. 23, 1943.  J. H. BECH  2,311,812
MILEAGE METER
Filed June 3, 1942  5 Sheets-Sheet 5

Inventor
John H. Bech,
By Seymour, Bright & Nottingham
Attorneys

Patented Feb. 23, 1943

2,311,812

UNITED STATES PATENT OFFICE 2,311,812

MILEAGE METER

John H. Bech, Forest Hills, N. Y., assignor to McCann-Erickson, Incorporated, New York, N. Y., a corporation of Delaware Application June 3, 1942, Serial No. 445,602

12 Claims. (Cl. 235—78)

This invention relates to calculating devices, and more particularly to a maximum mileage meter for use in computing the theoretical maximum distance which a vehicle using four tires in operation may travel on a set of five tires, assuming the mileage remaining available in each of the five tires is known.

The meter embodies a system of estimating maximum tire mileage, based upon the fact mileage remaining in a tire is proportional to the thickness of the tread, and quality of tire, i. e., first quality or second quality, and depending also upon the proper rotation of tires from one wheel of the vehicle to another.

The primary purpose of the invention is to produce a simple and inexpensive maximum mileage meter, and yet one which will be exceedingly effective for the purpose for which it is designed.

With the foregoing object outlined and with other objects in view which will appear as the description proceeds, the invention consists in the novel features hereinafter described in detail, illustrated in the accompanying drawings, and more particularly pointed out in the appended claims.

In the drawings:

Fig. 1 is a plan view of the device.

Fig. 2 is a side elevation or edge view of the same.

Figure 3:
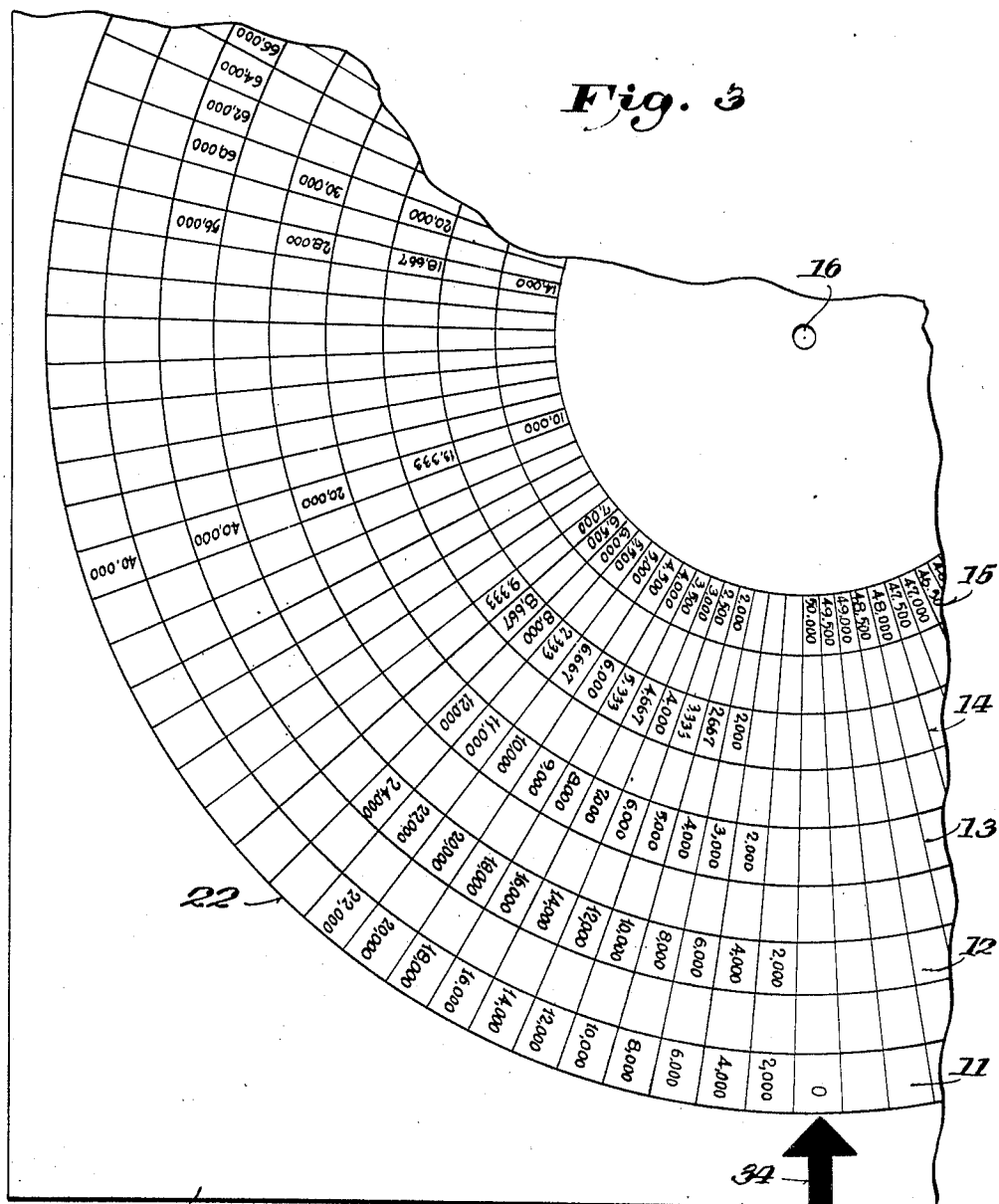
Fig. 3 is a fragmentary plan view of the base card or element.
Figure 4:
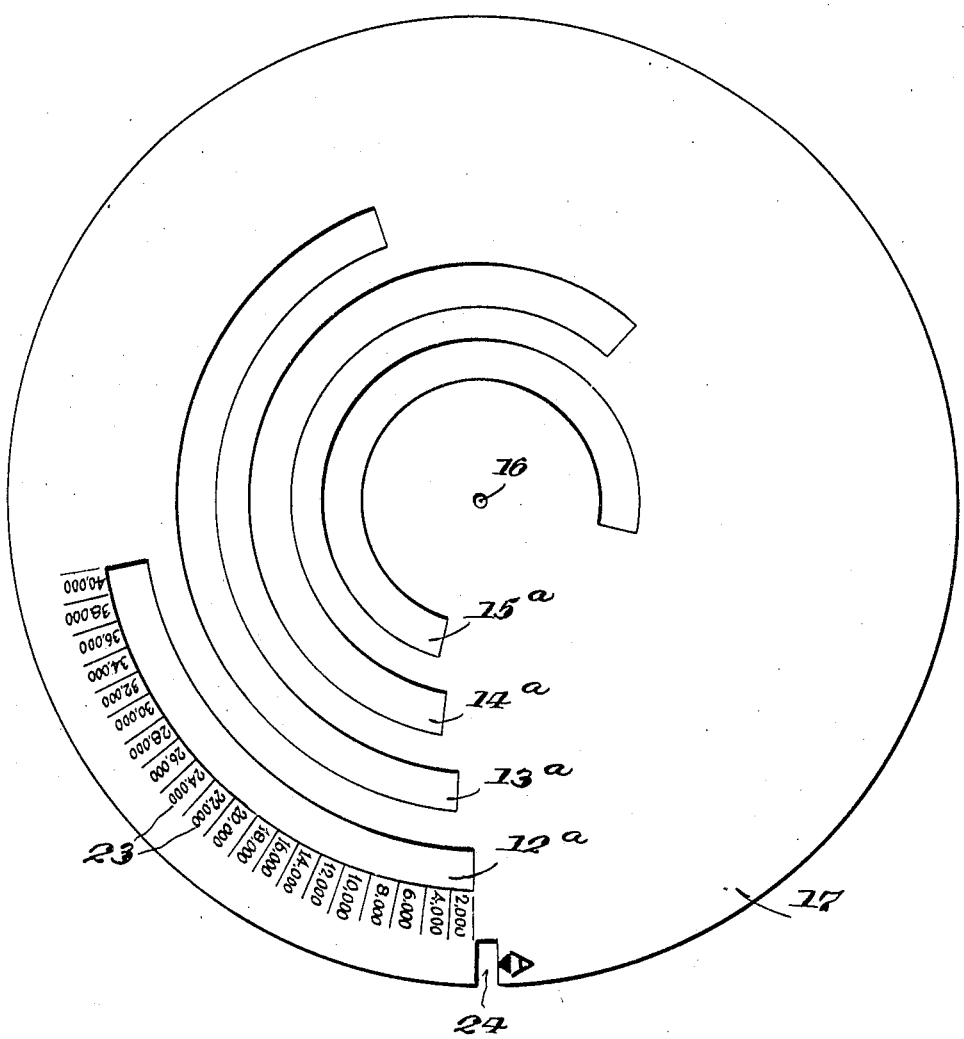
Figs. 4, 5, 6 and 7 are plan views, respectively, of the slotted disks of the device detached from the base card.

Referring to the drawings, 10 (Fig. 3) designates a card or base element of any suitable shape and material, preferably a rectangular piece of cardboard bearing upon its face four arcuate rows 11, 12, 13 and 14, and one substantially circular row 15 of numerals. These five arithmetic series of numbers are marked on the top surface of the card, and each number of each series is equidistant from the next greater number in that series. Each number of each series is equidistant with all the other numbers in that series from a center point 16, common to all five series. Furthermore, each series of numbers is at a different distance from the center point than any other series. For reference purposes, I will call the series 11 farthest from the center point, the first series, the second series 12 farthest from the center point, the second series, and so on. The second series of numbers is so placed that between each number of the first series and the center point, a number in the second series is equal to each number in the first series. For instance, in each radial row the number "8000" appears in both the first and second series. The third series of numbers is so placed that between each number of the first series and the center point, a number in the third series 13, equal to one-half of each number in the first series appears. For example, in the radial row, where "8000" appears in the first series, "4000" appears in the third series. The fourth series of numbers 14 is so placed that between each number in the first series and the center point, a number in the fourth series, equal to one-third of each number in the first series appears. For instance, in the radial row, where "8000" appears in the first series, the number in the fourth series is "2667." The fifth series of numbers 15 is so placed that between each number of the first series and the center point, a number in the fifth series 15 equal to one-fourth of each number in the first series appears. For example, in the radial row above mentioned, the number "2000" appears in the series 15.

Five movable members or concentric disks 17, 18, 19, 20 and 21 are rotatably mounted on the card 10 for rotation about the center point 16. These disks are in superposed relation and successively decrease in size from the disk 17 to the disk 21. The disk 17 is of a size to cover the circle 22 of the card in which the arcuate rows of numbers are arranged in spaced relation radially of the circle 22.

Each rotatable disk is marked as follows: An arithmetic series of numbers 23 is marked on its upper surface. Each number of the series is equidistant circumferentially from the next greater number in that series. Each number of the series is also equidistant from the center of rotation. The angle at the point of rotation between any two members of any series 23 is approximately equal to the angle at the center point 16 of the card previously described, between two corresponding numbers in the series on the flat surface previously referred to as the first series 11. It will also be noted that the arcuate rows of numbers 23 on the disks are positioned at the peripheral portion thereof, and each series 23 is covered by the disk immediately above.

Disk 17 is provided with arcuate slots or windows 12a, 13a, 14a and 15a to expose respectively, the numbers in the arcuate rows 12, 13, 14 and 15 of the base card. In addition, the disk 17 has a peripheral notch or window 24 of such width as to expose any single number of the series 11 of the card. An indicating letter "A" is placed on the disk adjacent to the notch 24.

Figure 5:
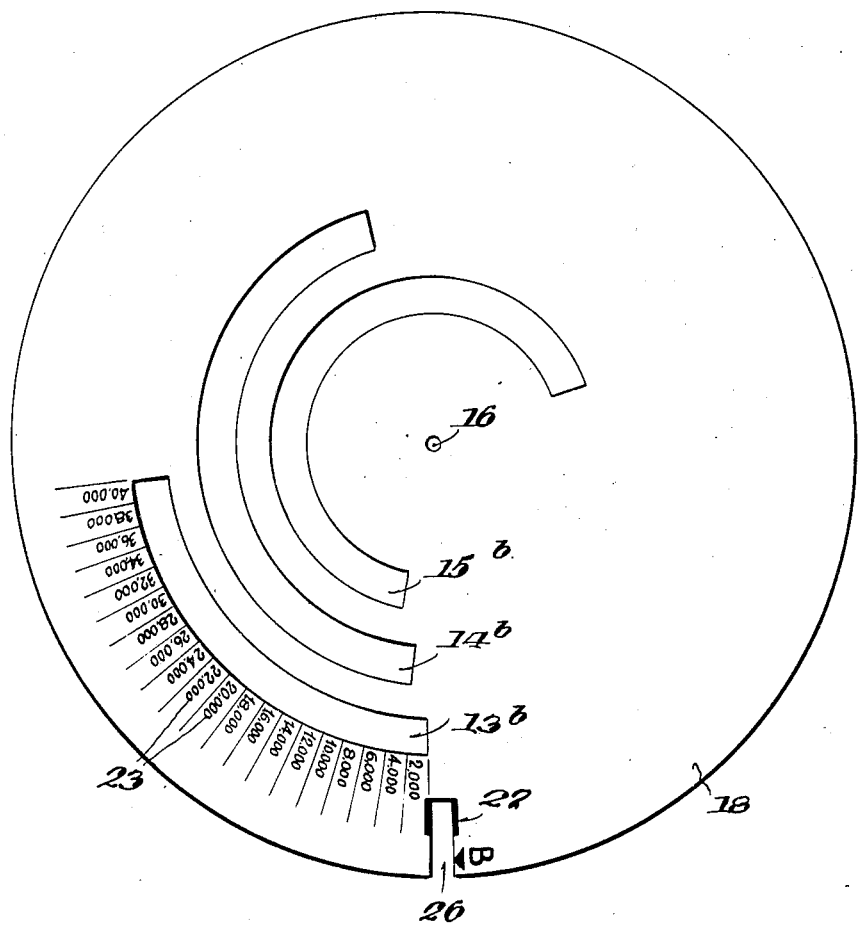
Figure 6:
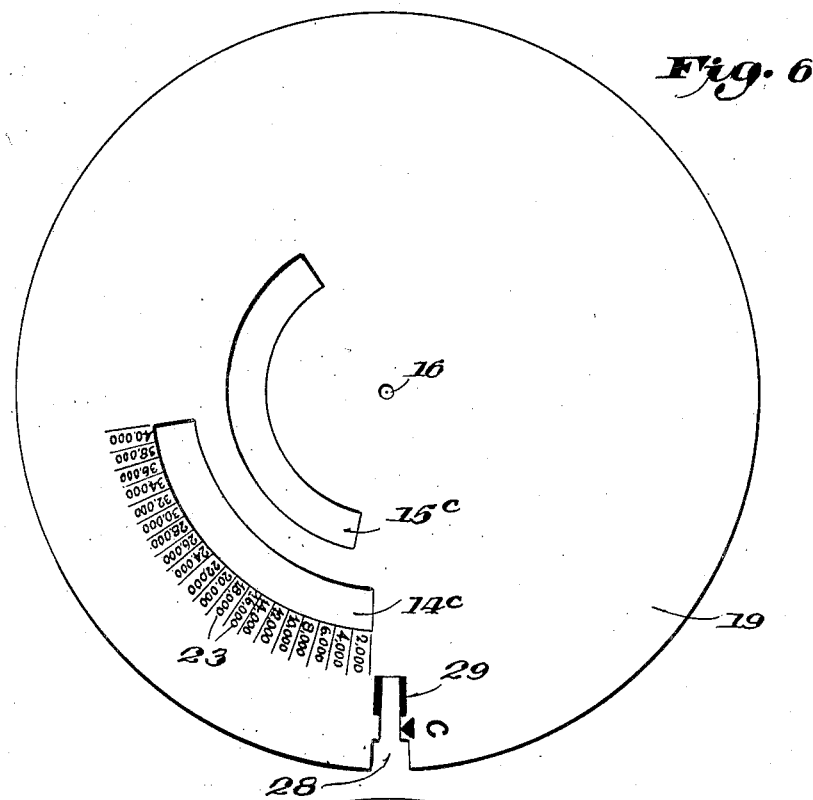
Figure 7:
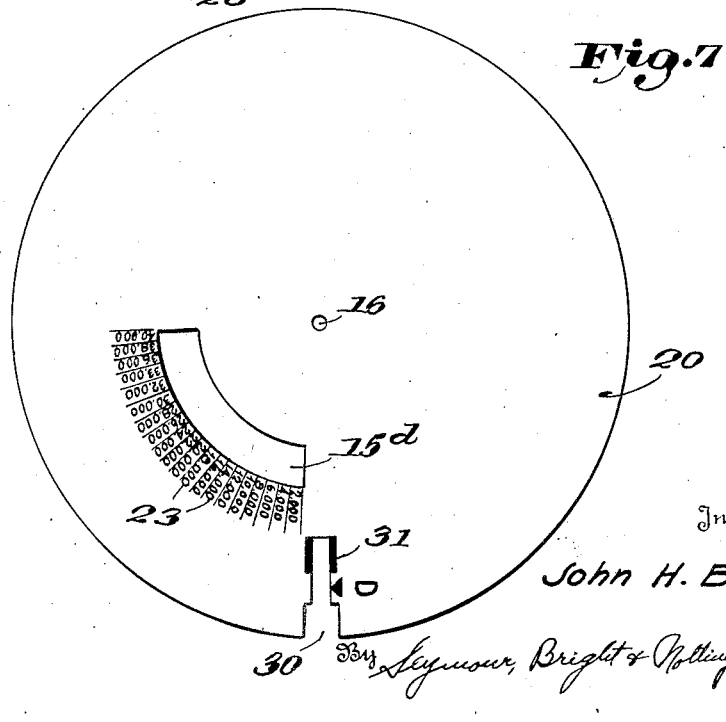

The next disk 18 is provided with three windows or arcuate slots 13b, 14b and 15b, registering respectively, with the slots 13a, 14a and 15a of the disk 17 in order to expose numerals in the arcuate rows 13, 14 and 15 of the card. Disk 18 has a peripheral notch or window 26 (Fig. 5) of such length radially of the disk to expose numerals of the row 23 of disk 17, and numerals of series 12 of the card through the slot 12a of the disk 17. The letter B indicates the notch 26, and a color indication 27 (purple, for example), is preferably employed with this notch.

Disk 19 has a pair of windows or arcuate slots 14c, 15c, registering respectively with the slots 14b and 15b to expose numerals in the rows 14 and 15 of the card, and the slot 14c is arranged adjacent the arcuate row of numerals 23 of the disk 19. Disk 19 has a peripheral notch or window 28 of such length as to expose numerals of the row 12 of the card 10, row 23 of the disk 18, and row 13 of the card, and a color indication 29 (green, for example), is arranged adjacent to the notch 28. This notch is also designated by the letter C.

Disk 20 has a single arcuate slot 15d registering with the slot 15c of the disk 19 to expose numerals in the series 15 of the card, and the numeral series 23 of disk 20 extends along the slot 15d. A notch or window 30 is arranged in the peripheral portion of the disk 20 to expose numerals in the series 13 of the card, series 23 of disk 19, and series 14 of the card. This notch may have a color indication 31 (blue, for example), and the indicating letter D.

Disk 21 simply has a peripheral notch 32 of a length to expose numerals in the row 15 of the card, row 23 of disk 20, and row 14 of the card, through the slots 14a, 14b, etc. The letter E is arranged adjacent to the notch 32, and a color indication 33 (brown, for example), may be used on the disk to define the notch 32.

In describing the operation of the device, for convenience, I will refer to the disks and the tires by the letters A, B, C, D and E which also indicate the notches.

In operation, the five tires of a car are gauged for tread depth with a known type of ruler marked in thirty-seconds of an inch, each thirty-second of an inch of tread depth representing the tread mileage of a particular tire, and the five tires are classified from worst to best, designated by the letters A, B, C, D and E. Upon the first gauging of the tires, the best tire E is placed on the right rear wheel; the next best D on the left rear wheel; the next best C on the right front wheel; the next best B on the left front wheel; and A on the spare. The tires are re-gauged each 2500 miles, reclassified as above, and changed from wheel to wheel in accordance with the above formula.

If, after the first gauging, the tires line up as follows: A—16,000 miles; B—18,000 miles; C—22,000 miles; D—26,000 miles, and E—26,000 miles, and it is desired to estimate the maximum mileage, we would proceed as follows:

Set all disks on the calculator with the openings at the indicated starting point 34; now rotate all disks together so that the opening in disk 17 will expose the 16,000 figure on the card through notch 24; then rotate the remaining disks together until the opening B exposes the 18,000 figure on disk 17. The figure 34,000 will then appear in the purple opening through notch 26. As the mileage of tire C is less than 34,000, it is necessary to continue with the calculation, and disks 19, 20 and 21 are moved together until the notch 28 exposes the 22,000 figure on disk 18. The figure 28,000 then appears in the green opening. As tire D has an indicated mileage of less than 28,000, it is necessary to proceed with the calculation, and disks 21 and 20 are moved together until the notch 30 exposes the 26,000 figure on disk 19, whereupon the figure 27,333 appears in the blue opening. As the tire E shows a mileage less than 27,333, it is necessary to proceed with the calculation and move disk 21 to expose the 26,000 figure on disk 20, whereupon the figure 27,000 appears in the brown window 33. This figure indicates the maximum mileage that may be obtained from the five tires by their proper rotation.

The above example shows the complete calculation, using all disks.

Taking, for example, tires gauged as follows: A—10,000 miles; B—12,000 miles; C—24,000 miles; D—28,000; and E—36,000 miles, the calculation would be as follows:

Move five disks simultaneously so that the window in disk 17 registers 10,000 miles. Move disks 18, 19, 20 and 21 simultaneously until the window in 18 exposes the 12,000 figure on disk 17, whereupon the figure 22,000 appears in the purple window. As the mileage of tire C is 24,000 miles, or in excess of the 22,000 miles appearing in the purple window, no further calculation is necessary, as the 22,000 miles is the maximum mileage that may be obtained from the five tires.

It will be noted that the notch 26 of disk 18 has a radial length equal to two arcuate rows of numerals, while the notches 28, 30 and 32 of the disks 19, 20 and 21 are each three rows deep.

It will also be observed that the notches or additional window means 26, 28, 30 and 32 of the disks 18, 19, 20 and 21 all coincide or register with corresponding openings in the other disks to permit the reading of numerals in the second, third and fourth series of the base card, as the final result does not always appear in the colored notch 32 of the disk 21. It will be noted further that all the disks, with the exception of the bottom one 17, have window means or notches for exposing numerals on the disks immediately below them and on the base card.

From the foregoing it is believed that the construction, operation and advantages of the device may be readily understood, and it is apparent that changes may be made in the details without departing from the spirit of the invention. It is also obvious that the principle of the invention could be carried out by using parallel belts or nested concentric cylinders, in place of the base card and disks.

What I claim and desire to secure by Letters Patent is:

1. A maximum mileage meter, comprising a base element provided with spaced first, second, third, fourth and fifth series of numerals, first, second, third, fourth and fifth members movable relatively to the base element and to one another, each of the movable members, with the exception of the fifth, being provided with a row of numerals overlying a blank space between two series of numerals of the base element, the first movable member being provided with window means to expose the numerals in the second, third, fourth and fifth series of the base element, the second movable member having window means to expose numerals in the third, fourth and fifth series of the base element, the third movable member having window means to expose numerals in the fourth and fifth series of the base element, the fourth movable member being provided with window means to expose numerals in the fifth series of the base element, the first movable member having an additional window means to expose numerals in the first series of the base element, and the second, third, fourth and fifth movable members each having an additional window means for exposing respectively, numerals in a row of numerals of the first, second, third and fourth movable members.

2. A maximum mileage meter, comprising a base element provided with spaced first, second, third, fourth and fifth series of numerals, first, second, third, fourth and fifth members rotatable relatively to the base element and to one another, each of the movable members, with the exception of the fifth, being provided with a row of numerals overlying a blank space between two series of numerals of the base element, the first movable member being provided with four windows to expose the numerals in the second, third, fourth and fifth series of the base element, the second movable member having three windows to expose numerals in the third, fourth and fifth series of the base element, the third movable member having a pair of windows to expose numerals in the fourth and fifth series of the base element, the fourth movable member being provided with a window to expose numerals in the fifth series of the base element, the first movable member having an additional window to expose numerals in the first series of the base element, and the second, third, fourth and fifth movable members each having an additional window for exposing respectively, numerals in a row of numerals of the first, second, third and fourth movable members.

3. A maximum mileage meter, comprising a base card provided on the upper face thereof with spaced first, second, third, fourth and fifth series of numerals arcuately arranged about a common center, first, second, third, fourth and fifth disks arranged in superposed relation and rotatable about said center, each of the disks, with the exception of the fifth being provided with an arcuate row of numerals overlying a blank space between two series of numerals of the base card, the first disk being provided with four windows to expose the numerals in the second, third, fourth and fifth series of the base card, the second disk having three windows to exhibit numerals in the third, fourth and fifth series of the base card, the third disk having a pair of windows to display numerals in the fourth and fifth series of the base card, the fourth disk being provided with a window to expose numerals in the fifth series of the base card, the first disk having an additional window to expose numerals in the first series of the base card, and the second, third, fourth and fifth disks each having an additional window for exposing respectively, numerals in a row of numerals of the first, second, third, and fourth disks.

4. A maximum mileage meter, comprising a base element provided with spaced first, second, third, fourth and fifth series of numerals, first, second, third, fourth and fifth members movable relatively to the base element and to one another, each of the movable members, with the exception of the fifth, being provided with a row of numerals overlying a blank space between two series of numerals of the base element, the first movable member being provided with four windows to expose the numerals in the second, third, fourth and fifth series of the base element, the second movable member having three windows to expose numerals in the third, fourth and fifth series of the base element, the third movable member having a pair of windows to expose numerals in the fourth and fifth series of the base element, the fourth movable member being provided with a window to expose numerals in the fifth series of the base element, the first movable member having an additional window to expose numerals in the first series of the base element and the second, third, fourth and fifth movable members each having an additional window for exposing respectively, numerals in a row of numerals of the first, second, third and fourth movable members, the numerals in each of the series of numerals on the base element successively increasing in value from one end of the series to the other.

5. A maximum mileage meter, comprising a base card provided on the upper face thereof with spaced first, second, third, fourth and fifth series of numerals arcuately arranged about a common center, first, second, third, fourth and fifth disks arranged in superposed relation and rotatable about said center, each of the disks, with the exception of the fifth, being provided with an arcuate row of numerals overlying a blank space between two series of numerals of the base card, the first disk being provided with four windows to expose the numerals in the second, third, fourth and fifth series of the base card, the second disk having three windows to exhibit numerals in the third, fourth and fifth series of the base card, the third disk having a pair of windows to display numerals in the fourth and fifth series of the base card, the fourth disk being provided with a window to expose numerals in the fifth series of the base card, the first disk having an additional window to expose numerals in the first series of the base card, and the second, third, fourth and fifth disks each having an additional window for exposing respectively, numerals in a row of numerals of the first, second, third, and fourth disks, each series of numbers on the base card being at a different distance from the center point than any other series, the second series of numbers being so placed that between each number of the first series and the center point, a number in the second series is equal to the number in the first series.

6. A maximum mileage meter, comprising a base card provided on the upper face thereof with spaced first, second, third, fourth and fifth series of numerals arcuately arranged about a common center, first, second, third, fourth and fifth disks arranged in superposed relation and rotatable about said center, each of the disks, with the exception of the fifth being provided with an arcuate row of numerals overlying a blank space between two series of numerals of the base card, the first disk being provided with four windows to expose the numerals in the second, third, fourth and fifth series of the base card, the second disk having three windows to exhibit numerals in the third, fourth and fifth series of the base card, the third disk having a pair of windows to display numerals in the fourth and fifth series of the base card, the fourth disk being provided with a window to expose numerals in the fifth series of the base card, the first disk having an additional window to expose numerals in the first series of the base card, and the second, third, fourth and fifth disks each having an additional window for exposing respectively, numerals in a row of numerals of the first, second, third, and fourth disks, each series of numbers on the base card being at a different distance from the center point than any other series, and the third series of numbers being so placed that between each number of the first series and the center point, a number in the third series is equal to one-half of each number in the first series.

7. A maximum mileage meter, comprising a base card provided on the upper face thereof with spaced first, second, third, fourth and fifth series of numerals arcuately arranged about a common center, first, second, third, fourth and fifth disks arranged in superposed relation and rotatable about said center, each of the disks, with the exception of the fifth, being provided with an arcuate row of numerals overlying a blank space between two series of numerals of the base card, the first disk being provided with four windows to expose the numerals in the second, third, fourth and fifth series of the base card, the second disk having three windows to exhibit numerals in the third, fourth and fifth series of the base card, the third disk having a pair of windows to display numerals in the fourth and fifth series of the base card, the fourth disk being provided with a window to expose numerals in the fifth series of the base card, the first disk having an additional window to expose numerals in the first series of the base card, and the second, third, fourth and fifth disks each having an additional window for exposing respectively, numerals in a row of numerals of the first, second, third and fourth disks, each series of numbers on the base card being at a different distance from the center point than any other series, and the fourth series of numbers being so placed that between each number of the first series and the center point, the number in the fourth series is equal to one-third of each number in the first series.

8. A maximum mileage meter, comprising a base card provided on the upper face thereof with spaced first, second, third, fourth and fifth series of numerals arcuately arranged about a common center, first, second, third, fourth and fifth disks arranged in superposed relation and rotatable about said center, each of the disks, with the exception of the fifth being provided with an arcuate row of numerals overlying a blank space between two series of numerals of the base card, the first disk being provided with four windows to expose the numerals in the second, third, fourth and fifth series of the base card, the second disk having three windows to exhibit numerals in the third, fourth and fifth series of the base card, the third disk having a pair of windows to display numerals in the fourth and fifth series of the base card, the fourth disk being provided with a window to expose numerals in the fifth series of the base card, the first disk having an additional window to expose numerals in the first series of the base card, and the second, third, fourth and fifth disks each having an additional window for exposing respectively, numerals in a row of numerals of the first, second, third, and fourth disks, each series of numbers on the base card being at a different distance from the center point than any other series, and the five series of numbers being so placed that between each number of the first series and the center point, a number in the fifth series is equal to one-fourth of each number in the first series.

9. A maximum mileage meter, comprising a base element provided with a plurality of arcuately arranged series of numerals which are concentric about a common center point, the numerals in the series being divided into radial rows, the numerals in each radial row at one end of that row being equal to one-fourth of the number at the opposite end of that row, a series of superposed disks rotatably mounted on the base element for movement about said common center point, the disks between the uppermost disk and the base element being provided with windows for exposing numerals in the radial rows on the base element, each of the disks between the uppermost disk and the base element having an arcuate row of numerals increasing successively in value from one end thereof to the opposite end thereof, the numerals in said arcuate rows corresponding with one another on the disks between the uppermost disk and the base element, all of said disks having radially disposed windows for exposing numerals on the parts immediately below the same.

10. A maximum mileage meter, comprising a base element provided with spaced first, second, third, fourth and fifth series of numerals, first, second, third, fourth and fifth members movable relatively to the base element and to one another, each of the movable members, with the exception of the fifth, being provided with a row of numerals overlying a blank space between two series of numerals of the base element, the first movable member being provided with window means to expose the numerals in the second, third, fourth and fifth series of the base element, the second movable member having window means to expose numerals in the third, fourth and fifth series of the base element, the third movable member having window means to expose numerals in the fourth and fifth series of the base element, the fourth movable member being provided with window means to expose numerals in the fifth series of the base element, the first movable member having an additional window means to expose numerals in the first series of the base element, and the second, third, fourth and fifth movable members each having an additional window means for exposing respectively, numerals in a row of numerals of the first, second, third and fourth movable members, the additional window means in the second movable member being arranged to expose numerals in the second series on the base element, in the third movable member to expose numerals in the third series on the base element, in the fourth movable member to expose numerals in the third and fourth series on the base element, and in the fifth movable member to expose numerals in the fourth and fifth series on the base element through certain registering window means of the first, second, third and fourth movable members.

11. A maximum mileage meter, comprising a base element provided with a plurality of arcuately arranged series of numerals which are concentric about a common center point, the numerals in the series being divided into radial rows, the numerals in each radial row at one end of that row being equal to one-fourth of the number at the opposite end of that row, a series of superposed disks rotatably mounted on the base element for movement about said common center point, the disks between the uppermost disk and the base element being provided with windows for exposing numerals in the radial rows on the base element, each of the disks between the uppermost disk and the base element having an arcuate row of numerals increasing successively in value from one end thereof to the opposite end thereof, the numerals in said arcuate rows corresponding with one another on the disks between the uppermost disks and the base element, the angle at the point of rotation between any two numbers in any of the arcuate rows of numerals of the disks being approximately equal to the angle at the center point of the base element between two corresponding numbers in a series of numerals of the base element, all of said disks having radially disposed windows for exposing numerals on the parts immediately below the same, and on the base element through other window means on intervening disks.

12. A maximum mileage meter, comprising a base element provided with a plurality of arcuately arranged series of numerals which are concentric about a common center point, the numerals in the series being divided into radial rows, the numerals in each radial row at one end of that row being equal to one-fourth of the number at the opposite end of that row, a series of superposed disks rotatably mounted on the base element for movement about said common center point, the disks between the uppermost disk and the base element being provided with windows for exposing numerals in the radial rows on the base element, each of the disks between the uppermost disk and the base element having an arcuate row of numerals increasing successively in value from one end thereof to the opposite end thereof, the numerals in said arcuate rows corresponding with one another on the disks between the uppermost disk and the base element, the arcuate rows of numerals of the disks being positioned adjacent the peripheries thereof, all of said disks having radially disposed windows for exposing numerals on the parts immediately below the same and on the base element through other window means on intervening disks.

JOHN H. BECH.